(Model.)
J. H. CASSIDY.
SEALING DEVICE.
No. 248,086. Patented Oct. 11, 1881.
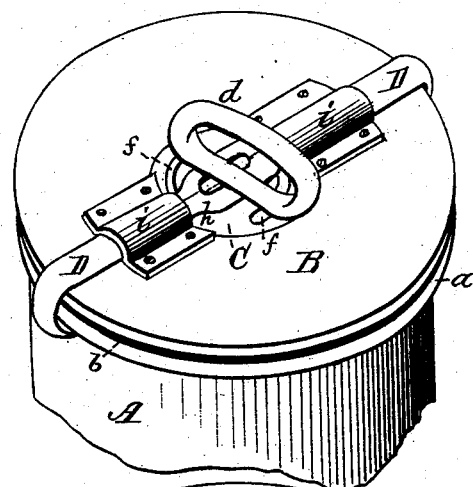
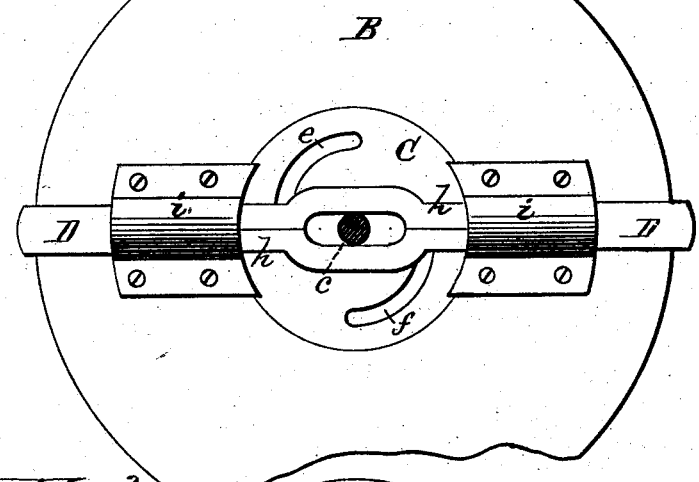
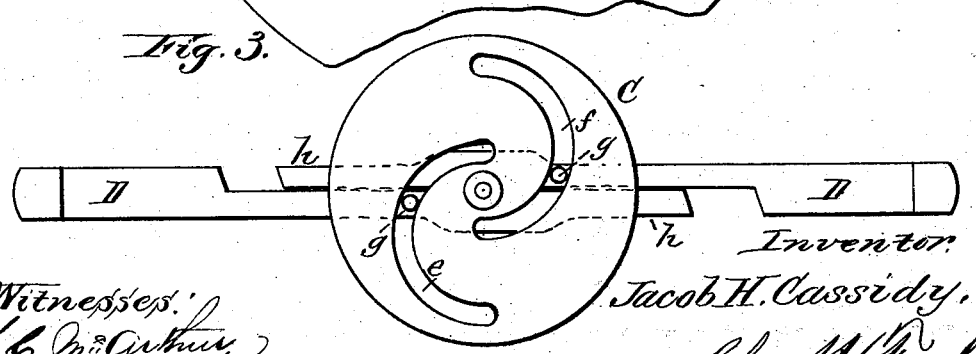
Witnesses:
H. C. McArthur
L. L. Miller
Inventor:
Jacob H. Cassidy,
per Chas. H. Fowler,
Attorney.

UNITED STATES PATENT OFFICE.

JACOB H. CASSIDY, OF LEAVENWORTH, KANSAS.

SEALING DEVICE.

SPECIFICATION forming part of Letters Patent No. 248,086, dated October 11, 1881.

Application filed August 2, 1881. (Model.)

*To all whom it may concern:*

Be it known that I, JACOB H. CASSIDY, of Leavenworth, in the county of Leavenworth and State of Kansas, have invented certain new and useful Improvements in Sealing Devices for Cans, Jars, and other Vessels; and I do hereby declare that the following is a full, clear, and exact description of the same, reference being had to the annexed drawings, making a part of this specification, and to the letters and figures of reference marked thereon.

Figure 1 of the drawings is a perspective view of my invention, showing the lid or cover clamped or sealed to the vessel. Fig. 2 is a top-plan view on an enlarged scale, with the handle for operating the cam-disk removed; and Fig. 3 is an under-side-plan view of the cam-disk and clamping-jaws removed from the lid or cover.

The present invention consists in certain new and useful improvements in sealing devices for cans, jars, and all descriptions of vessels that require air-tight sealing; and the object thereof is to provide a simple, positive, and efficient clamping device or mechanism, to seal air-tight and suitably pack a lid or cover to any rigid-mouthed vessel. These objects I attain by the construction substantially as shown in the drawings, and hereinafter described.

In the accompanying drawings, A represents the vessel, of any suitable form, construction, and size, and of metal, wood, stone, or other like rigid material. The mouth of the vessel A is preferably formed or provided with an annular flange or rim, $a$, upon which rests the rim of a suitable lid or cover, B, said lid or cover having a suitable packing-ring, $b$, for insuring a perfect sealing of the cover or lid when secured to the mouth of the vessel.

A double-slotted cam-disk, C, is connected to the upper side of the lid or cover by being countersunk the thickness of itself into the same. This disk C has rigidly connected to it the shank $c$ of a handle, $d$, said handle, when moved to the right or left, turning the disk to seal or unseal the lid or cover, as the case may be. The disk C has two cam-slots, $e\,f$, set opposite each other, and of the form shown in Fig. 3. Into the slots $e\,f$ enter pins $g$, projecting from the under side of the shanks $h$, formed on the clamping-jaws D. The clamping-jaws D move independently of each other, and at their extreme outer ends are reverted to form hooks to catch under the flange or rim of the vessel, these hooks being slightly beveled so as to wedge the lid or cover down when the jaws are drawn inward.

The shanks $h$ of the jaws D slide against each other or side by side through the bearing-caps, hereinafter described, and are so formed or bent that when together an elongated opening is presented between them, through which passes the shank $c$ of the handle $d$, thus allowing the shanks of the jaws to slide freely upon each side of the shank in the process of sealing or unsealing the vessel.

The caps $i$ are connected to the cover or lid B, and perform the functions of bearings for the jaws D and shanks $h$, said caps projecting far enough over the disk C to retain it in a true horizontal position.

By taking hold of the handle $d$ and rotating the cam-disk C one-half turn, through the action of the slots $e\,f$ upon the pins $g$ the jaws D will be forced outwardly and disengaged from the flange or rim of the vessel, when the cover may be removed. By turning the disk C in an opposite direction the jaws D will be drawn inwardly until the hooked ends thereof catch under the rim or flange of the vessel and tightly seal it.

I do not desire to be understood as confining my invention to any special construction or form of vessel, or to the uses to which it may be applied, as the sealing device is equally applicable to cans, jars, casks, barrels, or other rigid-mouth vessels where a tightly-sealing lid or cover is found necessary.

Having now fully described my invention, what I claim as new, and desire to secure by Letters Patent, is—

In a device for sealing vessels, the double-slotted cam-disk C, with handle attachment, the reverted jaws D, having shanks $h$, with pins $g$, and the bearing-caps $i$, in combination with the lid or cover B, substantially as and for the purpose specified.

JACOB H. CASSIDY.

Witnesses:
CHAS. CROUSE,
RICHARD FOX.